United States Patent
Sawant et al.

(10) Patent No.: US 8,213,723 B2
(45) Date of Patent: Jul. 3, 2012

(54) METHOD AND SYSTEM FOR DETERMINING NEAR DUPLICATE IMAGES

(75) Inventors: Neela Sawant, Mumbai (IN); Srinivasan H. Sengamedu, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 758 days.

(21) Appl. No.: 12/344,744

(22) Filed: Dec. 29, 2008

(65) Prior Publication Data

US 2010/0166321 A1 Jul. 1, 2010

(51) Int. Cl.
*G06K 9/64* (2006.01)

(52) U.S. Cl. ............... 382/219; 348/14.03; 358/3.01; 358/1.15; 382/119; 382/209; 382/281; 382/294; 382/298; 715/700; 717/120

(58) Field of Classification Search .............. None
See application file for complete search history.

(56) References Cited

U.S. PATENT DOCUMENTS

| | | | |
|---|---|---|---|
| 6,944,227 B1 * | 9/2005 | Bober | 375/240.22 |
| 7,204,416 B1 * | 4/2007 | Desai et al. | 235/454 |
| 7,724,826 B2 * | 5/2010 | Bober | 375/240.22 |
| 2008/0235200 A1 * | 9/2008 | Washington et al. | 707/4 |

* cited by examiner

*Primary Examiner* — John Lee
(74) *Attorney, Agent, or Firm* — Seth H. Ostrow; Ostrow Kaufman LLP

(57) ABSTRACT

The present invention provides a method and system for determining near-duplicate images. The method and system includes performing a Fourier-Mellin transform on each of a plurality of images. For each image of the plurality of images, the method and system includes generating a signature based on the Fourier-Mellin transform. The method and system includes comparing the signature of at least one of the images to at least one of the signatures of the other plurality of images and determining any near duplicate images based on the comparing of the signatures.

9 Claims, 3 Drawing Sheets

METHOD AND SYSTEM FOR DETERMINING NEAR DUPLICATE IMAGES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to image processing and more specifically performance of image processing operations on multiple images to determine near-duplicate images.

BACKGROUND OF THE INVENTION

Image processing operations relating to network-based or web-based activities can provide a multitude of complications based on various factors associated with images. A common concern is the file size of the image and complications that arise from increased processing load associated with the file size. Another complication is the accuracy and efficiency of an image search operation.

For example, complications include increased data storage when storing multiple copies of an image. Based on the size of these images, it is inefficient to store multiple copies or near duplicates of the same image, but there are currently limited options for determining if the data storage is storing duplicate or near duplicate copies of the image. Existing techniques can include examining metadata or overhead data of the files and if there is a match, performing a direct image comparison. Direct image comparison is very expensive in processing requirements, thus not a viable option outside of very small scale operations.

Another example is the search results for a search operation. Search engines include the ability to perform an image search. Typically, this search is done based on metadata or related information associated with an image, e.g. tag data from a photo sharing site. Existing web-based systems do not have the ability to submit images as the searching input and output results are not optimized based on culling duplicate and near-duplicate images. Therefore, it is reasonable for a search result to include multiple copies of the same image or near duplicate images, retrieved from different locations, thus obfuscating the search results. Similarly, a person would be unable to perform a search operation to determine if anyone has improperly used his or her image, or even if another person has used and subsequently modified his or her image.

Existing systems do not account for image duplications based on the computational overhead associated with image processing. The web-based searching operations operate on a time factor and utilize techniques to improve searching speed while not detracting from search accuracy. It is unrealistic to perform straight image to image comparison in web-based searching operations, as the determination of duplicate images detracts from the speed of a searching operation. As such, there exists a need for a technique for determining near-duplicate images between multiple images.

SUMMARY OF THE INVENTION

The present invention provides a method and system for determining near-duplicate images. The method and system includes performing a Fourier-Mellin transform on each of a plurality of images. For each image of the plurality of images, the method and system includes generating a signature based on the Fourier-Mellin transform. The method and system includes comparing the signature of at least one of the images to at least one of the signatures of the other plurality of images and determining any near duplicate images based on the comparing of the signatures.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and design changes may be made without departing from the scope of the present invention.

Figure 1:
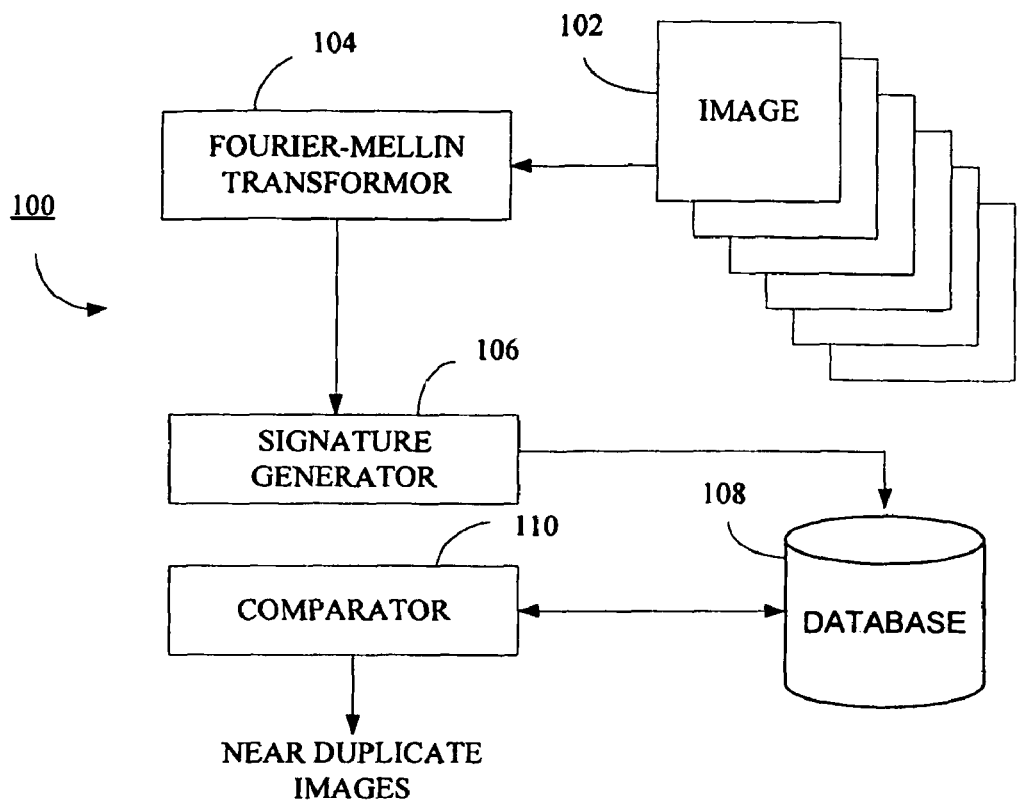
FIG. 1 illustrates a block diagram of one embodiment of a system for determining near-duplicate images.

FIG. 1 illustrates a system 100 for determining near-duplicate images. The system includes a plurality of images 102, a Fourier-Mellin transformer 104, a signature generator 106, a database 108 and a comparator 110.

In the system 100, the images 102 may be any number of images. The images may be centrally stored or distributed images. For example, the images may be from a central storage location, e.g. a database or an image web location, or stored in a distributed manner, such as a stored across a plurality of databases and/or websites. The images may be any suitable format capable of being displayed in a corresponding display platform. For example, the images may be in a generally recognized format for display on a web page or other general location or could be formatted in a proprietary format readable by a proprietary application. Regardless of the formatting of the images 102, it is understood that the images may be disposed in a uniform fashion prior to any processing operations, such as being normalized into a standard image size or standardized to a specific formatting.

The Fourier-Mellin transformer 104 may be one or more processing devices operative to perform processing operations providing the Fourier-Mellin transform. In one embodiment, the transformer 104 includes a processing device operative to perform the operations in response to executable instructions from a computer readable medium. The transformer 104 may also be implemented in software for performing the operations described herein, but it is recognized that the transformer 104 may also be a physical device performing physical processing operations for the processing and physical transformation of computational resources within the physical device.

The signature generator 106 may also be one or more processing devices operative to perform processing operations relating to the generation of a signature. In one embodiment, the generator 106 includes a processing device operative to perform the operations in response to executable instructions from a computer readable medium. The generator 106 may also be implemented in software for performing the operations described herein, but it is recognized that the generator 106 may also be a physical device performing physical processing operations for the processing and physical transformation of computational resources within the physical device.

The database 108 may be one or more storage device operative to store data therein. The database 108 may be a local or remote storage location and operative to perform data storage and permitting data access in accordance with known storage techniques.

The comparator 110 is operative to perform processing operations relating to comparison operations. In one embodiment, the comparator 110 includes a processing device operative to perform the operations in response to executable instructions from a computer readable medium. The comparator 110 may also be implemented in software for performing the operations described herein, but it is recognized that the comparator 110 may also be a physical device performing physical processing operations for the processing and physical transformation of computational resources within the physical device.

Figure 2:
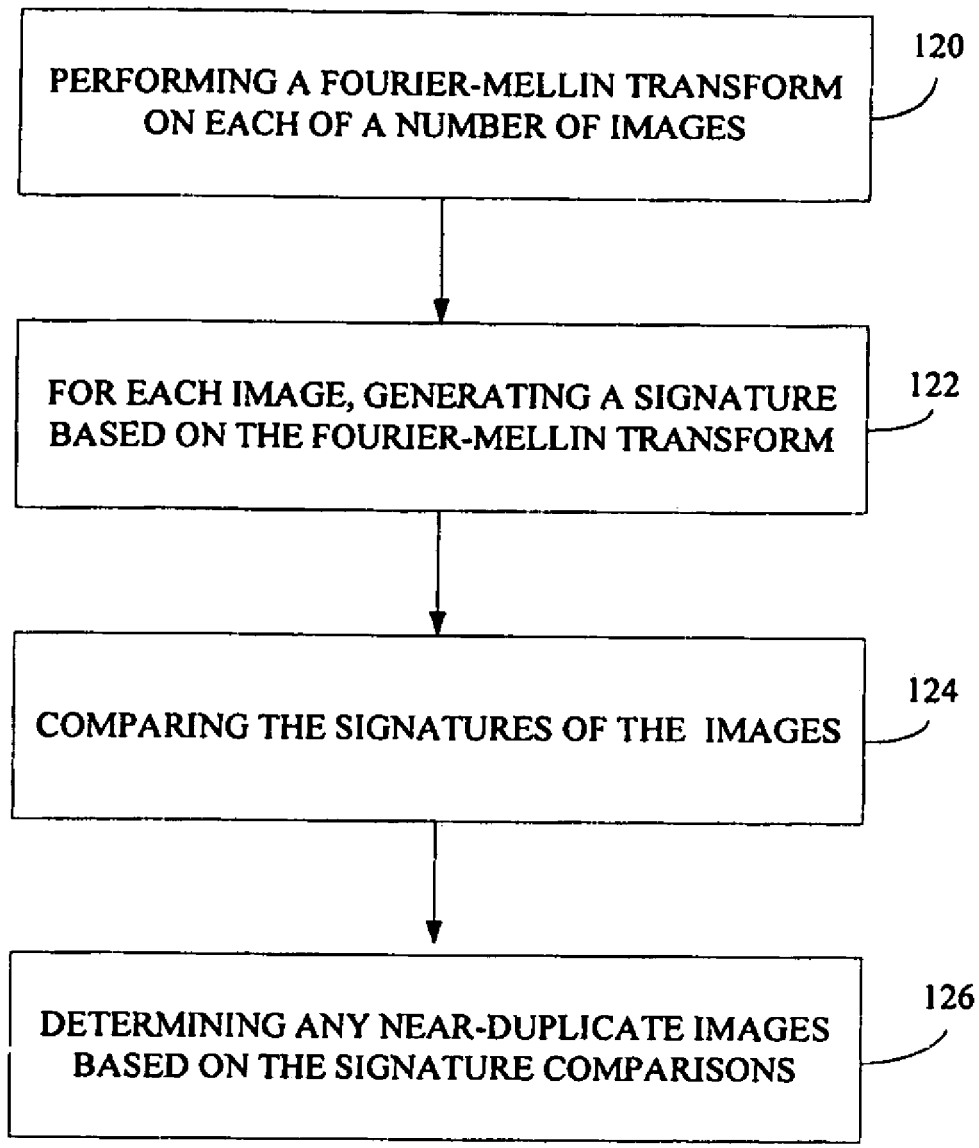
FIG. 2 illustrates a flowchart of the steps of one embodiment of a method for determining near-duplicate images.

The system 100 is operative to perform operations for determining near-duplicate images. The operations of one embodiment of the system 100 are described relative to the steps of the flowchart of FIG. 2. FIG. 2 illustrates a flowchart of one embodiment of a method for determining near-duplicate images.

A first step, step 120, is to perform a Fourier-Mellin transform on each of a number of images. With reference to FIG. 1, the transformer 104 receives each of the images 102 and performs the operations thereon.

Fourier-Mellin Transform (FMT) is a well established technique primarily used in image registration for image rotation, translation and scale (RTS) invariant properties. The FMT of an image is computed using the analytical fourier-mellin transform. Formally, if $f(r,\theta)$ represents the irradiance function of a gray-scale image in polar coordinates, then the analytical Fourier-Mellin transform (AFMT) of f is given by equation 1.

$$T_{f\sigma}(k,v) = \frac{1}{2\pi}\int_0^1 \int_0^{2\pi} f(r,\theta) r^{\sigma-iv} e^{-ik\theta} \frac{dr}{r} d\theta \qquad \text{Equation 1}$$

For all k in Z, v in R and $\sigma>0$. Equation 1 is the ordinary FMT applied to a distorted presentation of the image, as noted Equation 2.

$$f_\sigma(r,\theta)=r^\sigma f(r,\theta) \qquad \text{Equation 2}$$

The technique uses a discrete approximation of the AFMT, as described in S. Derrode et F. Ghorbel, *Robust and efficient Fourier-Mellin transform approximations for invariant grey-level image description and reconstruction*, Computer Vision and Image Understanding, Vol. 83(1), pp. 57-58, Jul. 2001. This approach provides a computationally efficient algorithm by converting an image to a log-polar coordinate system.

The log-polar transformation of an image is a mapping from the Cartesian plane (x,y) to the log-polar plane (r,θ) computed with respect to a reference point $(x_o, y_o)$ as noted in Equations 3 and 4.

$$r = \log\sqrt{(x-x_0)^2 + (y-y_0)^2} \qquad \text{Equation 3}$$

$$\theta = \tan^{-1}\left(\frac{y-y_0}{x-x_0}\right) \qquad \text{Equation 4}$$

Thus, the r coordinate of a point is proportional to the logarithm of its radial distance from the reference point in the original Cartesian space. The θ coordinate encodes the angular distance between the line joining the present point and the reference point with one of the Cartesian axes, typically the X-axis. The origin of the log-polar coordinate system is located on the centroid of the image. In this embodiment, Equation 1 can be modified as noted in Equation 5.

$$T_{f\sigma}(k,v) = \frac{1}{2\pi}\int_{-\infty}^{+\infty}\int_0^{2\pi} e^{q\sigma} f(e^q,\theta) e^{-1(k\theta+qv)} d\theta\, dq \qquad \text{Equation 5}$$

By aligning the center of log-polar system with the image centroid in Cartesian space, invariance to translation can be achieved. However, this approach is principally targeted to segmented objects. An alternative approach for translation invariance is attained by resorting to the magnitude of the Fourier transform. For example, let $f_2(u,v)$ by a replica of image $f_1(x,y)$ rotated by angle $\theta_o$ and translated.

$$u = x\cos\theta_o + y\sin\theta_o - x_o \qquad \text{Equation 6}$$

$$v = -x\sin\theta_o + y\cos\theta_o - y_o \qquad \text{Equation 7}$$

The relationship between the Fourier transforms can be derived as noted in Equations 8-10.

$$F_1(\psi_x,\psi_y) = F_2(\psi_u,\psi_v) e^{-j(w_x x_0 + w_y y_0)} \qquad \text{Equation 8}$$

$$w_o = w_x \cos\theta_o + w_y \sin\theta_o \qquad \text{Equation 9}$$

$$w_v = -w_x \sin\theta_o + w_y \cos\theta_o \qquad \text{Equation 10}$$

Thereupon, this shows that the magnitude of $F_2$ is translation invariant and is also a rotated replica of $F_1$. This phase difference can be captured using a polar representation where it is reflected as a shift along the θ dimension. Similarly the scale difference is reflected as a shift along the r dimension.

The log-polar representation converts rotation and scale changes in Cartesian system to shifts along log-polar axes. Using the translation-invariance property of Fourier-transform magnitude, the system achieves invariance to these shifts and consequently attains invariance to translation, rotation and scale changes in the original image.

A next step, step 122, is for each image, generating a signature based on the Fourier-Mellin transform. With reference to FIG. 1, once the transformer 104 performs the Fourier-Mellin transform, the result of that transform is used to generate a signature.

Each image is converted to gray-scale and resized to a fixed size to address any scale changes. The FMT-based fingerprint of a gray-scale image I(x,y) is computed in two steps. The first step is to transform I(x,y) to log-polar representation using the geometric center as the reference point and then computer the 2-D Fourier transform of the log-polar representation, where Mt and Pt are the magnitude and phase spectrum of T. The second step is a median thresholding step including reordering the central m by m window of $P_1$ in an $m^2$ dimensional vector, find the median value $m_{P1}$ of $v_{P1}$, create a binary representation of $v_{Pt}$ by setting all elements greater than $m_{Pt}$ to 1 and the rest of the elements to 0, similarly create an $n^2$ bit binary representation using the central n×n window of Mt and concatenate the two binary representations to generate a signature with $m^2+n^2$ bits.

As described in further detail relative to additional embodiments below, the window sizes (m, n) as well as the resolution of log-polar sampling (k, v) are two important parameters in tuning the performance of the FMT signature.

With reference to FIG. 1, one embodiment includes storing the signatures in the database 108. This step is not expressly noted in the steps of FIG. 2. The database 108 may store the signatures using any suitable storage technique usable for the subsequent retrieval of the images, as needed.

Referring back to FIG. 2, a next step, step 124, is comparing the signatures of the image. As noted in FIG. 1, this step may be performed by the comparator 110. In one embodiment, the comparator 110 compares each of the signatures stored in the database 108. As the signatures include hashing, the content of the signature is reduced and this improves the speed of the comparison operation. Not only does this increase the processing speed for the comparison speed, speed improvement also realizes a reduction in computational overhead needed for the comparison step, where these benefits are realizable in response to the Fourier-Mellin transformer 104 and the signature generator 106 processing the images 102.

In this embodiment, a next step 126, is determining any near-duplicate images based on the signature comparison. With reference to FIG. 1, this determination may be performed by the comparator 110, whereupon different embodiments may utilize the determination of near duplicate images for different purposes. For example, in one embodiment a search engine may eliminate duplicative search results based on the comparisons. In another example, a search may generate search results based on an input of an image using the comparison to find the near-duplicate images. Another example may include culling duplicate images in a data storage device by deleting near-duplicative images. Thereupon, in the embodiment illustrated in FIG. 2, the method is complete.

Figure 3:
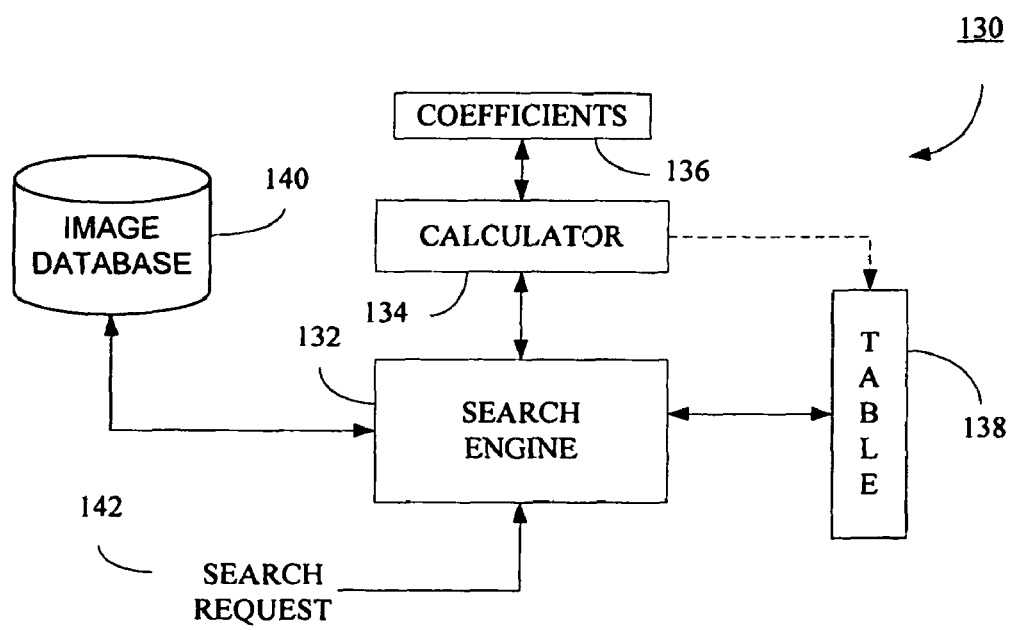
FIG. 3 illustrates a block-diagram of another embodiment of a system for determining near duplicate images.

FIG. 3 illustrates a block diagram on a system 130 operative to utilize the near-duplicate image determination described above. The system 130 includes a search engine 132, a calculator 134, a coefficients storage device 136, a table 138 and an image database 140. The calculator 134 is operative to perform the processing operations described above by the fourier-mellin transformer 104 and the signature generator 106 of FIG. 1. The search engine 132 may be any suitable type of search engine operative to receive a search request and perform search operations an response thereto.

In the system 130, the search engine 132 receives the search request 142, where the search request may be a word search request for an image search. For example, the search request may be the words "Golden Gate Bridge" requesting images of the Golden Gate Bridge.

The search engine is operative to retrieve image results from the image database 140, where it is recognized that in the context of a network-based search, the search may be conducted across a large number of databases storing images thereon and is not explicitly limited to a single database 140.

The search engine receives the image search results and thereupon performs operations to determine any near-duplicate images. The images may be provided to the calculator 134 for performing the FMT as well as the generation of a signature. In one embodiment, the signatures may be stored in the table 138 such that comparison operations may be quickly performed on the full set of signatures.

An alternative embodiment of the system of FIG. 3 includes the adjustment of coefficients 136. As noted above, enhancements can be made to the system for trade-offs in processing accuracy versus speed. For example, the coefficients of the window sizes (m, n) and the resolution of the log-polar sampling (k, v) can be adjusted to tune the performance of the FMT signature.

As to the log-polar grid resolution, the precision of duplicate detection increases as the resolution of the log-polar grid becomes finer. However, finer resolutions typically suffer from poorer recall.

The signature window sizes directly control the performance of FMT-based signatures. The performance is more influenced by phase signature than its magnitude counterpart. As the phase window shrinks, recall increases but at the cost of false positives. As such, the same signature size can be maintained for different precision and recall requirements simply by tuning the log-polar grid resolution. Recall can be improved by making the log-polar grid resolution coarser or precision can be enhanced by making the grid resolution finer. Additional control can be exercised by changing the signature size as well.

In the system 130, subject to the tuning of the coefficients 136, the search engine receives a search result set of images form the database 140. The system processes the images and compares the signatures. From this comparison, the search engine is able to cull near-duplicate images. As such, a search results output by the search engine 132 provides a more concise and efficient search result set by the elimination of near-duplicate images.

Figure 4:
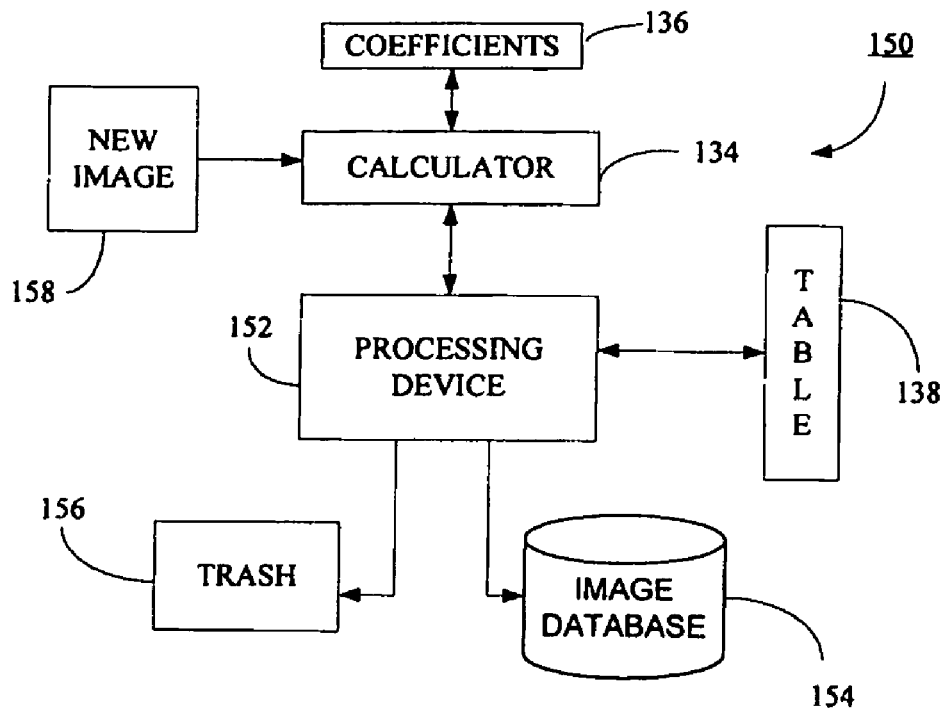
FIG. 4 illustrates a block diagram of another embodiment of a system for determining near-duplicate images.

FIG. 4 illustrates another embodiment of a system 150 for determination of near-duplicate images. The system 150 includes the processing device 152, calculator 134, coefficients 136, table 138, image database 154 and the trash 156. In this embodiment, the system 150 can optimize the storage of images in the database 154 by eliminating the redundant storage of near-duplicate images. The system 150 may operative two-fold, by examining the contents of the database 154 and/or performing the near-duplicate image determination prior to storage of an image in the database 154, where the system 150 already has knowledge of the images stored in the database 154, such as through the list of signatures stored in the table 138.

In this embodiment, a new image 158 is received by the calculator 134, which performs the FMT and the signature generation based on the coefficients 136. The processing device 152 receives the signature and if the system is populating the database 154, the processor may store the signature in the table 138 and the image in the database 154. If the system 150 is reducing redundant images, the processing device 152 may access the table to use the signature to determine if the signature already exists in the table 138. If the signature does exist in the table, the image may then be processed to the trash, e.g. discarded, as it would only be redundant to store in the database 154. If the system 150 is analyzing the database 154, e.g. to reduce duplicative storage, the processing device 152 may, if a near-duplicate image is determined based on the signatures, extract the image from the database 154 and then discard to the trash 158.

Figure 5:
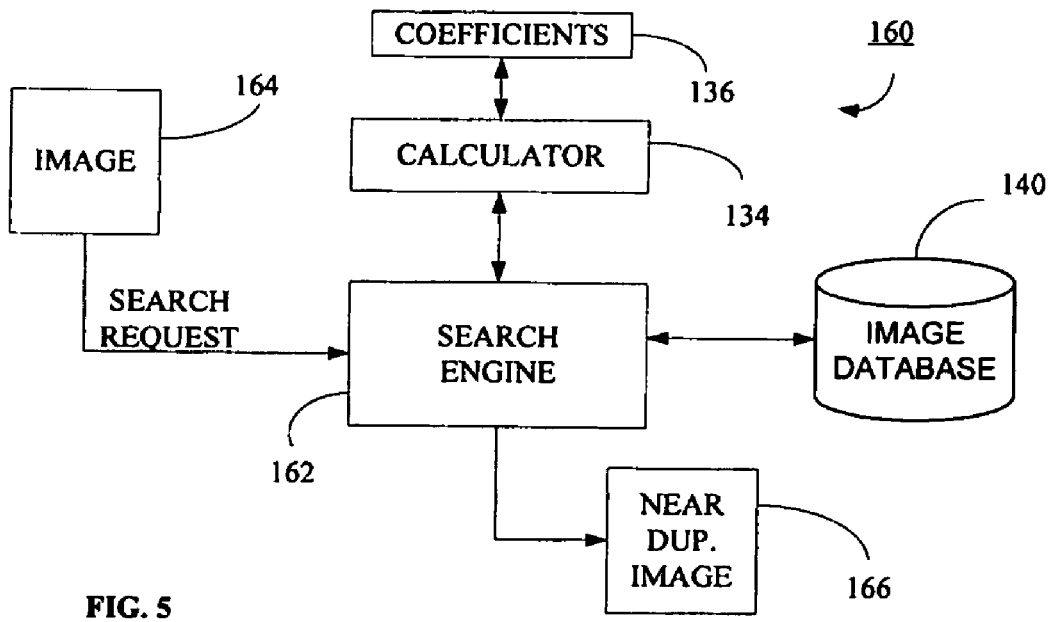
FIG. 5 illustrates a block diagram of another embodiment of a system for determining near duplicate images.

FIG. 5 illustrates another embodiment of a system 160 operative to use the near-duplicate image detection as described above. The system 160 uses a search engine 162, which in this embodiment is operative to receive an image 164 as an input search request. The system 160 includes the coefficients 136, calculator 134 and the image database 140 as described above.

The search engine 162 is operative to receive the image 164 as the search request, whereupon the search engine may generate a signature using the calculator 134, using the techniques described above, including tuning the system 160 using the coefficients 136. The search engine 162 may then search the image database 140, whereupon images from the database are also processed by the calculator 134. The search engine 162 determines if there is one or more near-duplicate images 166 based on the signatures, such as using operations similar to the comparator 110 of FIG. 1. As such, in this embodiment, a user may enter an image 164 as a search request to the search engine 162 to conduct search operations of the image database 140 for determining near duplicate images. An example application of this may be to determine if someone has illegally copied or modified another person's image, using the original image as the search request.

Additional enhancements can be realized through additional processing operations. One enhancement is the following scheme for computing FMT-base image fingerprints or signatures. A first step is to convert the input image to gray-scale and resize to a fixed size. A second step is to create a complex representation of the resized image using the magnitude and phase of its Fourier transform. A third step is to computer the Fourier-Mellin transform of the complex image. A fourth step is to select suitable central windows from the magnitude and phase of the FMT output. Reorder these values to create 1-D vector representations. A fifth step is to compute cosine of phase representation. A sixth step is to create binary phase and magnitude fingerprints by median thresholding of respective vectors. The seventh step is to append the phase and magnitude fingerprints to create the image signature.

As such, through the above-described process, the method and system determines near-duplicate images. This image detection allows for improved processing speed and computational efficiency in performing these operations, which also translates into realistic gains in various applications using the near-duplicate detection, as well as systems currently hampered by limitations associated with the processing and managing of images based on the content of the image itself and not being reliant on the metadata associated with an image.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for determining near-duplicate images, the method comprising:
   receiving a search request comprising at least one term associated with a content item appearing in at least one image;
   identifying a plurality of images in response to the search request;
   performing a Fourier-Mellin Transform on each of the identified plurality of images;
   for each image of the identified plurality of images, generating a signature based on the Fourier-Mellin transform comprising:
      converting the image to a gray-scale; if needed, resizing the gray-scale to a fixed size;
      transforming the gray scale to a log-polar representation using a center point as a reference point; and
      performing median thresholding including:
         reordering a first window of the image by a first squared dimensional vector;
         finding a median value of the vector;
         creating a binary representation of the median value of the vector, creating a second squared binary representation of a second window of the image; and
         concatenating the first binary representation and second binary representation to generate the signature;
   comparing the signature of a first of the plurality of images to at least the signature of at least a second of the plurality of images;

determining that at least the second image is a near-duplicate of the first image based on the comparing of the signatures; and generating a result set of images in response to the search request, the result set including the first image while excluding at least the second image based on the second image being a near-duplicate of the first image.

2. The method of claim 1, wherein the image search request includes a search request image, the method comprising:

performing a Fourier-Mellin Transform on the search request image;

generating a search request signature based on the Fourier-Mellin transform; and performing the search operation using the search request signature.

3. The method of claim 1 further comprising:

storing the plurality of images in a data storage device; and culling near-duplicate images stored in the data storage device.

4. A system for determining near-duplicate images, the system comprising:

a computer readable medium having executable instructions stored thereon; and a processing device in communication with the computer readable medium operative to receive the executable instructions therefrom, the processing device, in response to the executable instructions, operative to:

receive a search request comprising at least one term associated with a content item appearing in at least one image;

identify a plurality of images in response to the search request;

perform a Fourier-Mellin Transform on each of the identified plurality of images;

for each image of the identified plurality of images, generate a signature based on the Fourier-Mellin transform being operative to:

convert the image to a gray-scale; if needed, resize the gray-scale to a fixed size;

transform the gray scale to a log-polar representation using a center point as a reference point; and perform median thresholding including:

reordering a first window of the image by a first squared dimensional vector; finding a median value of the vector;

creating a binary representation of the median value of the vector, creating a second squared binary representation of a second window of the image; and concatenating the first binary representation and second binary representation to generate the signature;

compare the signature of a first of the plurality of images to at least one of the signatures of the other the signature of at least a second of the plurality of images;

determine that at least the second image is a near-duplicate of the first image based on the comparing of the signatures; and generate a result set of images in response to the search request, the result set including the first image while excluding at least the second image based on the second image being a near-duplicate of the first image.

5. The system of claim 4, wherein the image search request includes a search request image, the processing device, in response to the executable instructions, further operative to:

perform a Fourier-Mellin Transform on the search request image;

generate a search request signature based on the Fourier-Mellin transform; and perform the search operation using the search request signature.

6. The system of claim 4 further comprising:

a data storage device; and the processing device, in response to the executable instructions, operative to:

store the plurality of images in a data storage device; and cull near-duplicate images stored in the data storage device.

7. Non-transitory computer readable media comprising program code that when executed by a programmable processor causes execution of a method for determining near-duplicate images, the computer readable media comprising:

receiving a search request, comprising at least one term associated with a content item appearing in at least image;

identifying a plurality of images in response to the search request;

performing a Fourier-Mellin Transform on each of the identified plurality of images;

for each image of the identified plurality of images, generating a signature based on the Fourier-Mellin transform comprising:

converting the image to a gray-scale; if needed, program code for resizing the gray-scale to a fixed size;

transforming the gray scale to a log-polar representation using a center point as a reference point; and performing median thresholding including:

reordering a first window of the image by a first squared dimensional vector;

finding a median value of the vector; creating a binary representation of the median value of the vector, creating a second squared binary representation of a second window of the image; and concatenating the first binary representation and second binary representation to generate the signature;

comparing the signature of a first of the plurality of images to at least the signature of at least a second of the plurality of images;

determining that at least the second image is a near-duplicate of the first image based on the comparing of the signatures; and generating a result set of images in response to the search request, the result set including the first image while excluding at least the second image based on the second image being a near-duplicate of the first image.

8. The non-transitory computer readable media of claim 7, wherein the image search request includes a search request image, the method comprising:

performing a Fourier-Mellin Transform on the search request image;

generating a search request signature based on the Fourier-Mellin transform; and performing the search operation using the search request signature.

9. The non-transitory computer readable media of claim 7, the method further comprising:

storing the plurality of images in a data storage device; and culling near-duplicate images stored in the data storage device.

* * * * *